United States Patent [19]

Whipple

[11] Patent Number: 5,161,100
[45] Date of Patent: Nov. 3, 1992

[54] CLOSED LOOP PROPORTIONAL-INTEGRAL FLUID FLOW CONTROLLER AND METHOD

[75] Inventor: Richard B. Whipple, Tyler, Tex.

[73] Assignee: Gas Services, Inc., Tyler, Tex.

[21] Appl. No.: 485,037

[22] Filed: Feb. 26, 1990

[51] Int. Cl.$^5$ .................. G05B 13/02; G06F 3/00; G06F 9/00

[52] U.S. Cl. .................. 364/160; 364/146; 364/191; 364/143; 364/188; 55/210; 137/2

[58] Field of Search ............ 364/160, 161, 146, 188, 364/709.14, 709.15, 709.16, 147, 191, 143, 144; 55/18, 227, 228, 210, 213, 225; 137/86, 386, 389, 2, 395; 196/132; 73/23.35; 374/36

[56] References Cited

U.S. PATENT DOCUMENTS

| | | | |
|---|---|---|---|
| 4,094,959 | 6/1978 | Ball et al. | 364/161 |
| 4,133,615 | 1/1979 | Zitelli et al. | 364/161 |
| 4,265,263 | 5/1981 | Hobbs | 364/161 |
| 4,345,463 | 8/1982 | Wilson et al. | 374/36 |
| 4,418,381 | 11/1983 | Molusis et al. | 364/160 |
| 4,498,809 | 2/1985 | Farmer | 364/161 |
| 4,533,990 | 8/1985 | Takada et al. | 364/160 |
| 4,602,326 | 7/1986 | Kraus | 364/160 |
| 4,682,279 | 7/1987 | Watabe | 364/160 |
| 4,740,884 | 4/1988 | Shiho et al. | 364/143 |

*Primary Examiner*—Jerry Smith
*Assistant Examiner*—Jim Trammell
*Attorney, Agent, or Firm*—Baker & Botts

[57] ABSTRACT

A closed loop controller and method of operation are provided which allow for configuring the controller with two switches. In one mode of operation, the two switches (22) and (24) are manipulated to increase and decrease the integral time value and the proportional gain, respectively, of the controller (10). In another mode of operation, the first switch (22) is manipulated to select among a plurality of configuration parameters and the second switch (24) is manipulated to select the desired value of the selected parameter. Level shifting circuitry (14) is also provided to permit remote operation of the controller (10) using a modem.

26 Claims, 8 Drawing Sheets

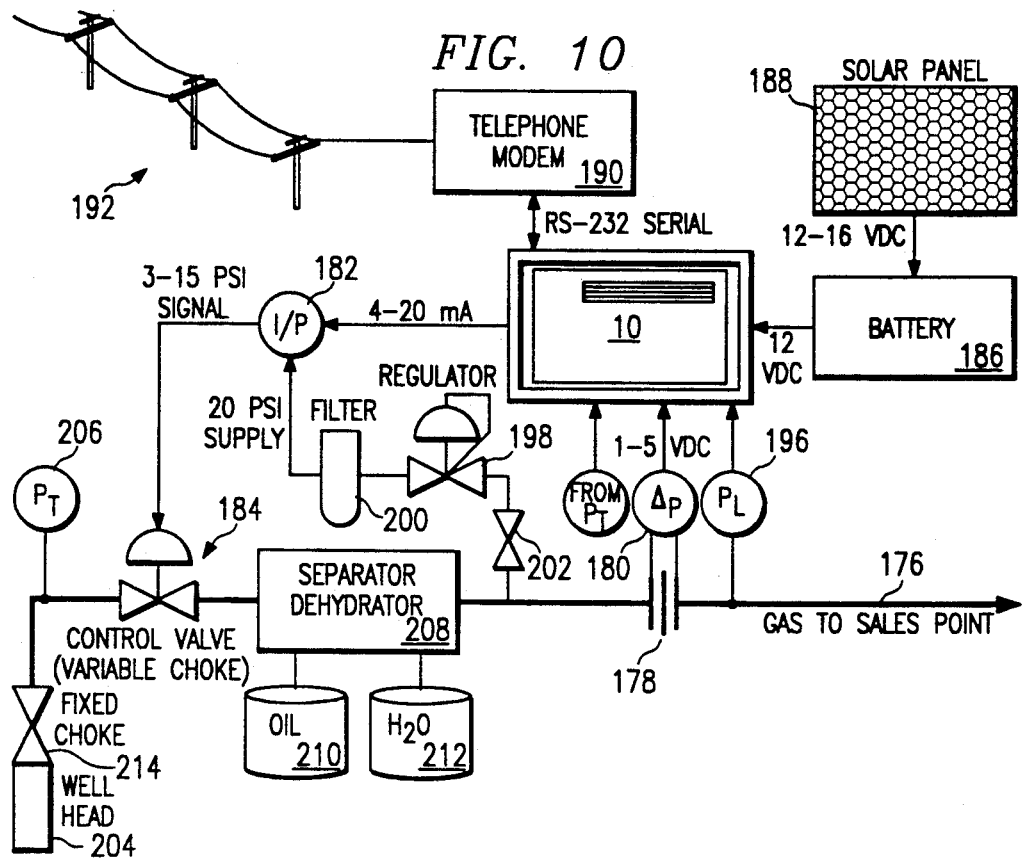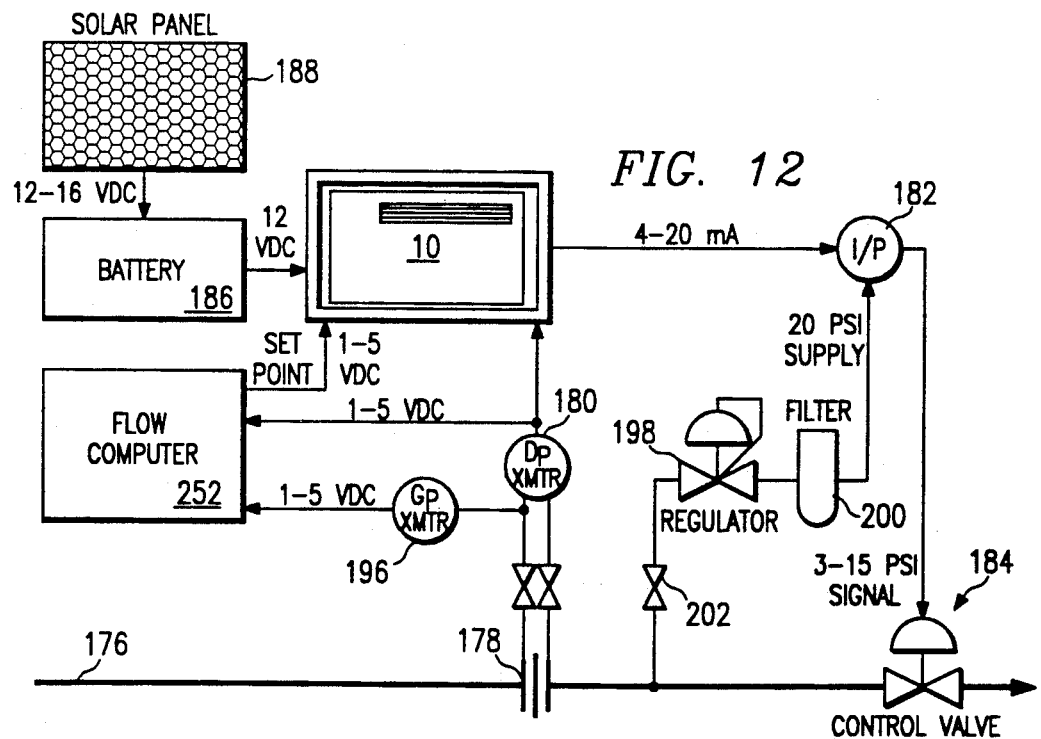

CLOSED LOOP PROPORTIONAL-INTEGRAL FLUID FLOW CONTROLLER AND METHOD

TECHNICAL FIELD OF THE INVENTION

This invention relates in general to the field of control systems, and more particularly to a closed loop controller and method suitable for controlling the flow of fluids.

BACKGROUND OF THE INVENTION

In the oil and gas industry, controllers are used to control the rate of flow and volume of fluid through a pipeline. Because controllers are used in oil and gas fields, it is important that the controllers be sufficiently rugged to withstand the rigors of such an environment, be self-contained and designed so as not to present a safety hazard, and be sufficiently easy to use to allow relatively unskilled field personnel to operate them. It is also a great convenience not to have the controllers depend upon commercial power systems as their power source. And, above all, the controller must be accurate. Existing controllers do not exhibit this combination of design features. In particular, they tend to be complicated and difficult to use and consume a large amount of power.

Therefore, a need has arisen for an accurate controller which is suitable for use in such rugged environments as the oil or gas industries, which consumes a small amount of power, and which is simple to operate by untrained personnel, yet fully programmable. A further need has arisen for a controller which can be operated remotely.

SUMMARY OF THE INVENTION

In accordance with the present invention, a closed loop controller is provided which substantially eliminates or reduces disadvantages and problems associated with prior controllers. More specifically, a system and method are provided for controlling the flow of fluids through a pipeline. The controller of the present invention is microprocessor based requiring small amounts of power and enabling the controller to operate from a solar array as its power source. The microprocessor can be programmed to account for numerous operating parameters and yet the programming process, using just a few switches, can be easily performed by field personnel who are not familiar with computer operation. More specifically, by manipulating only two double-pole, double-throw switches, the controller of the present invention can be fully programmed with great ease.

In accordance with another aspect of the present invention, a closed loop controller is provided which can be programmed and operated remotely through the use of a modem interface. The present invention can also be coupled to a small computer to provide volume control.

All aspects of the invention provide safe operation in an oil and gas field environment.

Thus, the present invention has the technical advantage of providing an easy to use, low power, safe and accurate controller for oil and gas field operations.

BRIEF DESCRIPTION OF THE DRAWINGS

For a more complete understanding of the present invention, and the advantages thereof, reference is now made to the following descriptions taken in conjunction with the accompanying drawings, in which:

FIG. 10 illustrates the use of the present invention as an on/off well controller;

FIG. 12 illustrates the use of the present invention with a flow computer for volume and rate control.

DETAILED DESCRIPTION OF THE INVENTION

A more complete understanding of the present invention may be derived by referring to the following detailed description when considered in connection with the accompanying FIGS. 1-12. Like numbers indicate like features throughout the drawings. In addition, reference designations for branch points in the flow charts and for signals contained in the schematic diagrams indicate connections which could not otherwise be adequately demonstrated due to space constraints.

Figure 1:
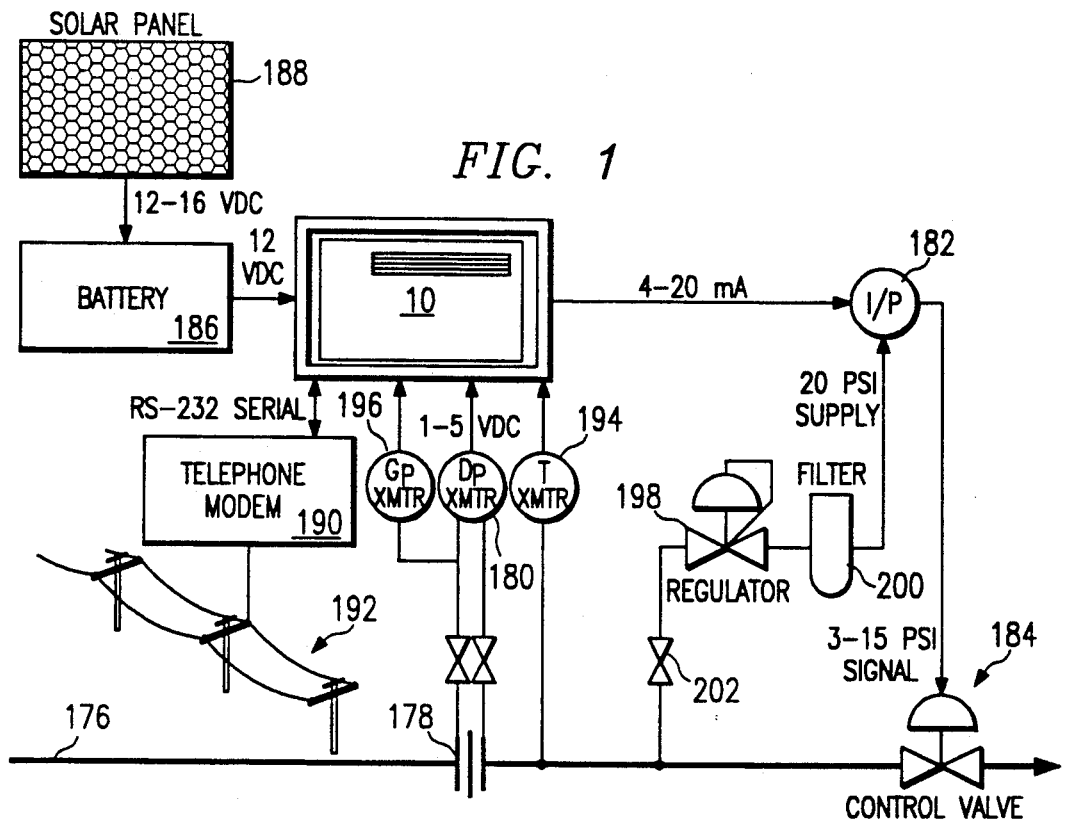
FIG. 1 illustrates a block diagram of the use of the present invention in a typical application.

FIG. 1 illustrates the use of the controller 10 of the present invention in a typical application and illustrates the connections between the controller 10 and various external components. An orifice 178 is placed in a pipeline, indicated generally at 176, and a differential pressure transmitter 180 and a static pressure transmitter 196 are coupled between the orifice 178 and the controller 10. A temperature transmitter 194 is coupled between the pipeline 176 and the controller 10. A valve 202 is coupled to the pipeline 176, a regulator 198 is coupled to the valve 202 and a filter 200 is coupled to the regulator 198. A current/pressure converter (referred to as an I/P converter) 182 is coupled between the controller 10 and a control valve 184 and is also coupled to the filter 200. A solar panel 188 is coupled to a battery 186 which is coupled to the controller 10. A telephone modem 190 is coupled between the controller 10 and local telephone lines indicated generally at 192. In operation, the pressure and temperature transmitters 196, 180 and 194 determine the current flow conditions of fluid through the pipeline 176 and transmit signals to the controller 10. The controller 10 processes the signals received from the transmitters 196, 180 and 194 and sends a signal, if needed, to the I/P controller to make an adjustment in the opening of the control valve 184. The processing loop is repeated periodically, thus keeping the fluid flow within limits programmed into the controller 10.

The controller 10 has low power requirements and can be powered by the battery 186 which is kept charged by the solar panel 188. Remote control of the controller 10 is provided by signals received from the telephone line 192 by the modem 190.

Figure 2:
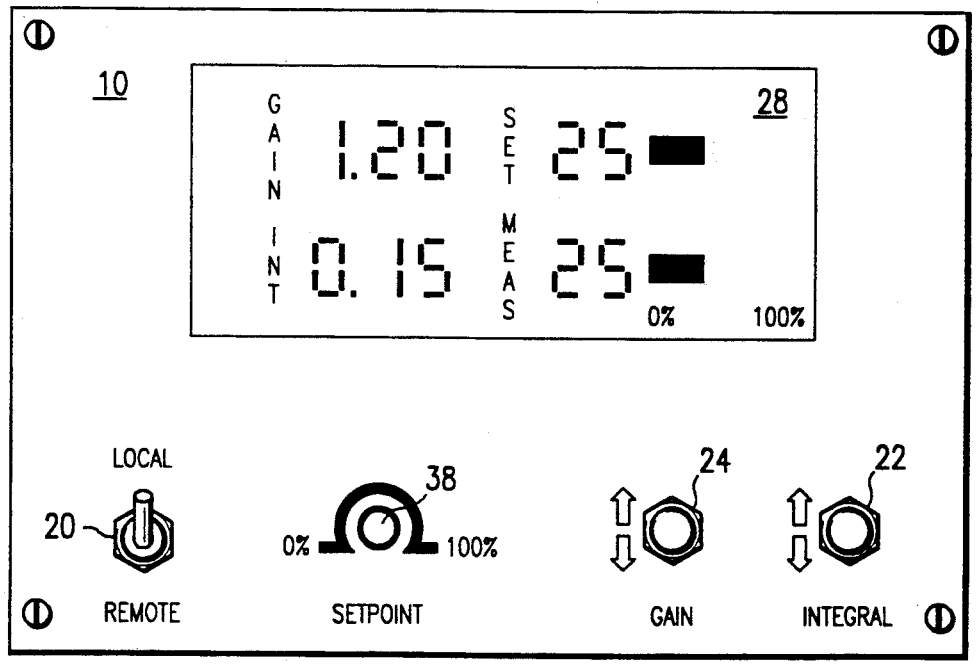
FIG. 2 illustrates the front panel controls and display of the present invention.

FIG. 2 illustrates the front panel controls and display of the controller 10. As will be described in more detail below, three toggle switches 20, 22 and 24 are coupled to a microprocessor through a switch buffer. A potentiometer 38 is coupled to the microprocessor through an analog-to-digital converter, and a display 28 is coupled to the microprocessor through a parallel I/O circuit.

The first switch 20 permits the controller 10 to be operated either locally or remotely through a modem coupled to the controller 10. The other two switches 22 and 24 each have two functions. When the controller 10 is first installed and placed in the configuration mode (by grounding an internal terminal connected to the parallel I/O circuit), one switch 22 (the integral switch) is raised or lowered in order to sequentially display on the display 28 the various configuration parameters which must be set (listed on TABLE 1 following this description). To select the parameter which is currently displayed on the display 28, the user allows the switch 22 to return to its off position. Then, the other switch 24 (the gain switch) is raised or lowered to increase or decrease the value of the parameter, which value is also displayed on the display 28. The user allows the gain switch 24 to return to its off position in order to select a desired value. After the controller 10 has been configured and placed in the normal operating mode, the integral switch 22 is raised or lowered to increase or decrease, respectively, the value of the integral time variable of the system, and the gain switch 24 is raised or lowered to increase or decrease, respectively, the value of the proportional gain variable. The values of the integral time and proportional gain variable are displayed on display 28. The desired local operating setpoint is established by rotating the potentiometer 38 until the desired value appears on the display 28. The display 28 also shows the actual measured setpoint.

Consequently, using just two toggle switches 22 and 24 and one potentiometer 38, the controller 10 can be completely and easily configured and operated. Field personnel, unskilled in the use of computer technology, can quickly learn to program and use the controller 10. It is not necessary for the user to master a complex keypad with its obscure codes. Instead, the controller 10 can be used with confidence with very little training.

Figure 3:
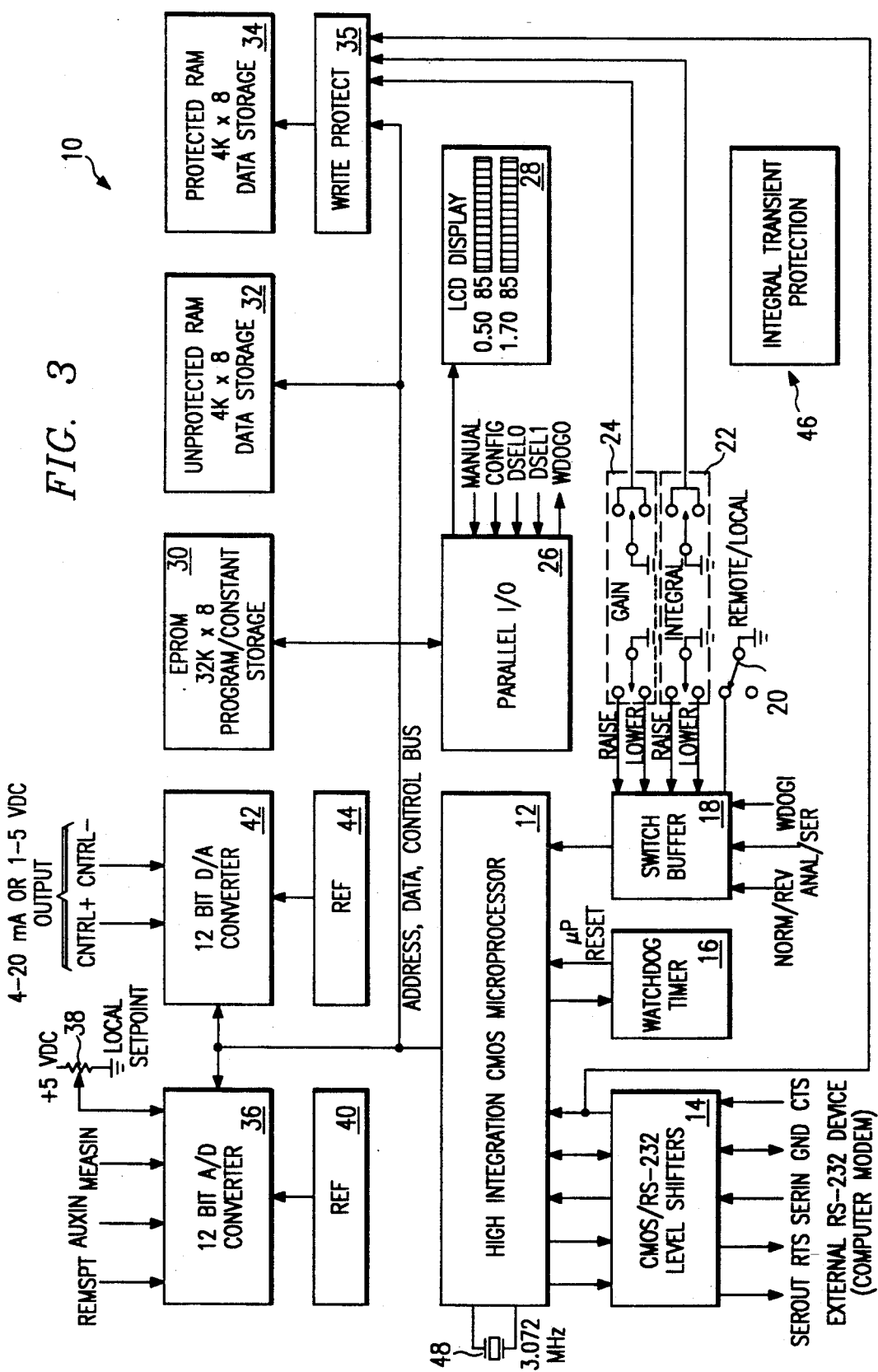
FIG. 3 illustrates a block diagram of the present invention.

FIG. 3 illustrates a block diagram of the controller 10, showing its general organization. A microprocessor 12 is a high integration, eight bit, low power CMOS microprocessor. In the preferred embodiment, the microprocessor 12 is a Hitachi HD64180 or a Zilog Z180 microprocessor. It serves to control all phases of the operation of the controller 10. CMOS design throughout the system permits the controller 10, which typically consumes less than 500 mW, to be powered by an inexpensive battery charged by a solar panel.

A level shifter 14 is coupled to the microprocessor 12 providing level shifting between the CMOS levels of the microprocessor 12 and the RS-232 levels of an external serial device, such as a computer or a modem (not shown). As indicated in FIG. 3, the signals supported by the level shifter 14 include:
Serial input from the external device;
Serial output to the external device;
Request-to-send logic output to the external device;
Clear-to-send logic input from the serial device; and
Ground.

A watchdog timer 16 is coupled to the microprocessor 12 and provides a means of recovering operation following a catastrophic interruption of the executing program such as might be caused by a high energy electromagnetic burst from nearby lighting. During normal program execution, the input from the microprocessor 12 to the watchdog timer 16 is pulsed several times each second. The watchdog timer 16 resets at each pulse in order to prevent a hardware reset of the microprocessor 12. However, should normal program execution be interrupted, it is unlikely that the watchdog pulses will continue from the microprocessor 12. After approximately four seconds without a pulse, the output from the watchdog timer 16 to the microprocessor 12 will make a transition to a low-logic state and cause a hardware reset of the microprocessor 12. If successful, the resulting warm boot of the microprocessor will allow the system 10 to resume normal operation.

A switching buffer 18 is coupled to the microprocessor 12 and provides interface circuitry to allow external switches to program the microprocessor 12. The switch 20 is coupled to the switch buffer 18 and is a single-pole, single-throw switch used to indicate to the microprocessor 12 whether operation of the controller 10 is local or remote. In the preferred embodiment, the integral and gain switches 22 and 24 are coupled to the switch buffer 18 and are each double-pole, double-throw switches with spring return to a center-off position. During normal operation of the system 10, the switches 22 and 24 are used to raise and lower the integral time value and proportional gain value, respectively. During configuration of the system 10, the integral switch 22 is used to select among different configuration parameters (listed in TABLE 1) and the gain switch 24 is used to set the desired value of the selected parameter. In this fashion, complete programming of the system 10 can be achieved using only these two front panel switches 22 and 24. As discussed below, the second poles of the switches 22 and 24 are used in connection with the memory-write protect feature of the system 10. Additional signal inputs, designated "NORM/REV," "ANAL/SER" and "WDOG1" are also provided to the switch buffer 18.

A parallel input/output interface 26 is coupled to the address, data and control buses of the microprocessor 12. The interface 26 provides an interface for a liquid crystal display 28 and provides an interface for certain control signals. One input to the interface 26, designated "CONFIG," is used to place the controller 10 in a configuration mode and one input, designated "MANUAL," is used to place the controller 10 in a manual mode. Two additional inputs, designated "DSEL0" and "DSEL1" in FIG. 3, are reserved for use in future versions of the controller 10 to select among different communications options. An output, designated "WDOG0" in FIG. 3, provides a watchdog status signal allowing external devices to sense a possible system failure.

An EPROM 30 is coupled to the bus lines and provides nonvolatile memory for the system 10. In the preferred embodiment, the EPROM 30 is a 32K×8 device. System operating instructions for the microprocessor 12 reside in the EPROM 30 along with numerous initialization constants for cold and warm boots.

The working memory of the controller 10 is divided into two portions. One portion, an unprotected RAM 32 is coupled to the bus lines and may be read from and written to by the microprocessor 12 at any time during the operation of controller 10. The remaining portion, a protected RAM 34, is coupled to an external write protect circuitry 35 which is coupled to the bus lines. The write protect circuitry 35 prevents data stored in the protected RAM 34 from being altered unless one of three conditions is met:
1. The gain switch 24 is raised or lowered;
2. The integral switch 22 is raised or lowered; or
3. The CTS (clear-to-send) signal from an external device to the level shifter 14 indicates that a serial data update to the protected RAM 34 is permitted.

In the preferred embodiment, both the unprotected RAM 32 and the protected RAM 34 share a built-in lithium backup battery to prevent data loss in the event the external power source (not shown) fails.

External signals from the pressure and temperature transmitters measuring the fluid flow are input into a 12-bit analog-to-digital converter 36 which is coupled to the bus lines of the microprocessor 12. The analog input signals are:
1. The remote set-point input ("REMSPT"), or optionally, the pressure signal input in a flow rate controller application;
2. The auxiliary signal ("AUX"), or optionally, the temperature signal input in the flow rate controller application;
3. The measured signal input ("MEASIN"), or optionally, the differential pressure signal input in the flow rate controller application; and
4. The position signal of the local set-point potentiometer 38.

By referencing a precision 5-volt DC source 40, the analog input signal range is from 0-5 volts and the converter's 12-bit digital output ranges from 0-4095.

After the input data has been processed, the microprocessor 12 sends a 12-bit digital signal through the bus lines to a digital-to-analog converter 42 for conversion into an analog range of 0-5 volts or 0-20 mA, depending upon the application. D/A converter 42 is coupled to microprocessor 12 by way of the bus lines and also uses a precision 5 volt DC reference voltage 44. Its analog outputs are "CNTRL+" and "CNTRL−."

Because the external connections of controller 10 are subject to electrical transients, such as those caused by lighting, all inputs and outputs are protected by special circuitry and printed circuit layout techniques, indicated generally at 46. This protection provides electrical isolation from the high voltage transients without interfering with the normal signals to and from the controller 10.

A crystal 48 is coupled to the microprocessor 12 to provide a timing reference.

SYSTEM SOFTWARE DESCRIPTION

Figure 4:
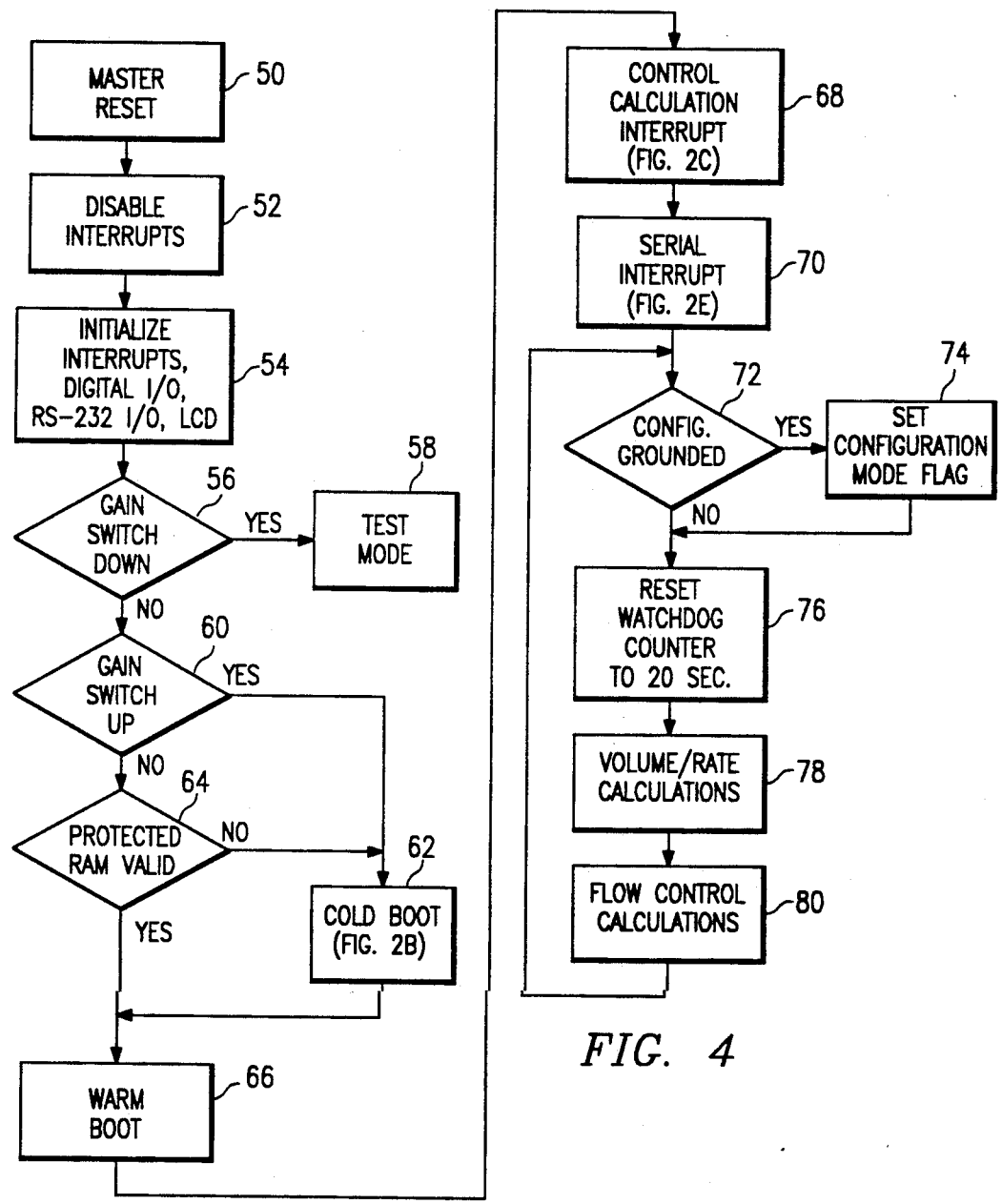
FIG. 4 illustrates a flow chart of the initialization and main operating loop of the present invention.
Figure 5:
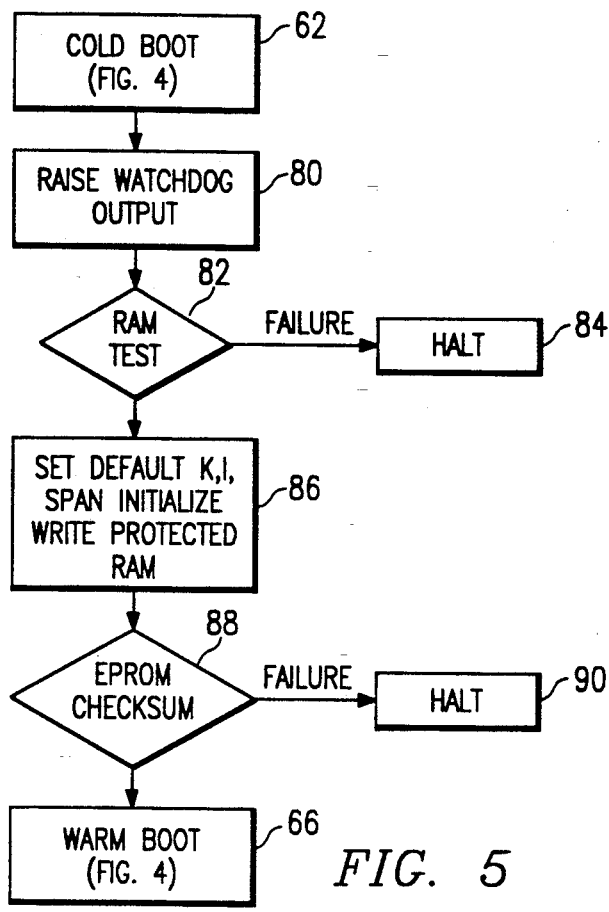
FIG. 5 illustrates a flow chart of the cold boot initialization of the present invention.
Figure 7:
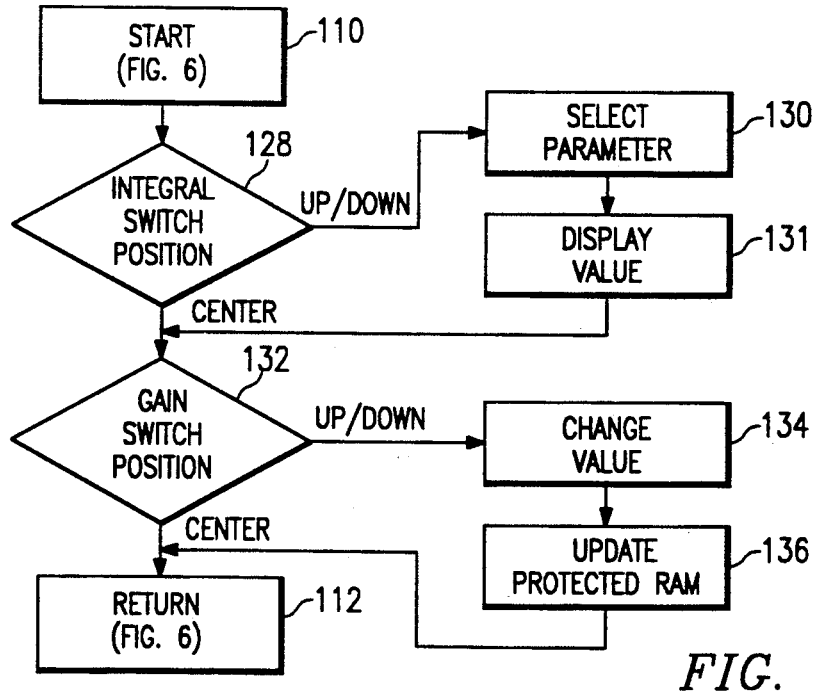
FIG. 7 illustrates a flow chart of the configure mode processing of the present invention.
Figure 6:
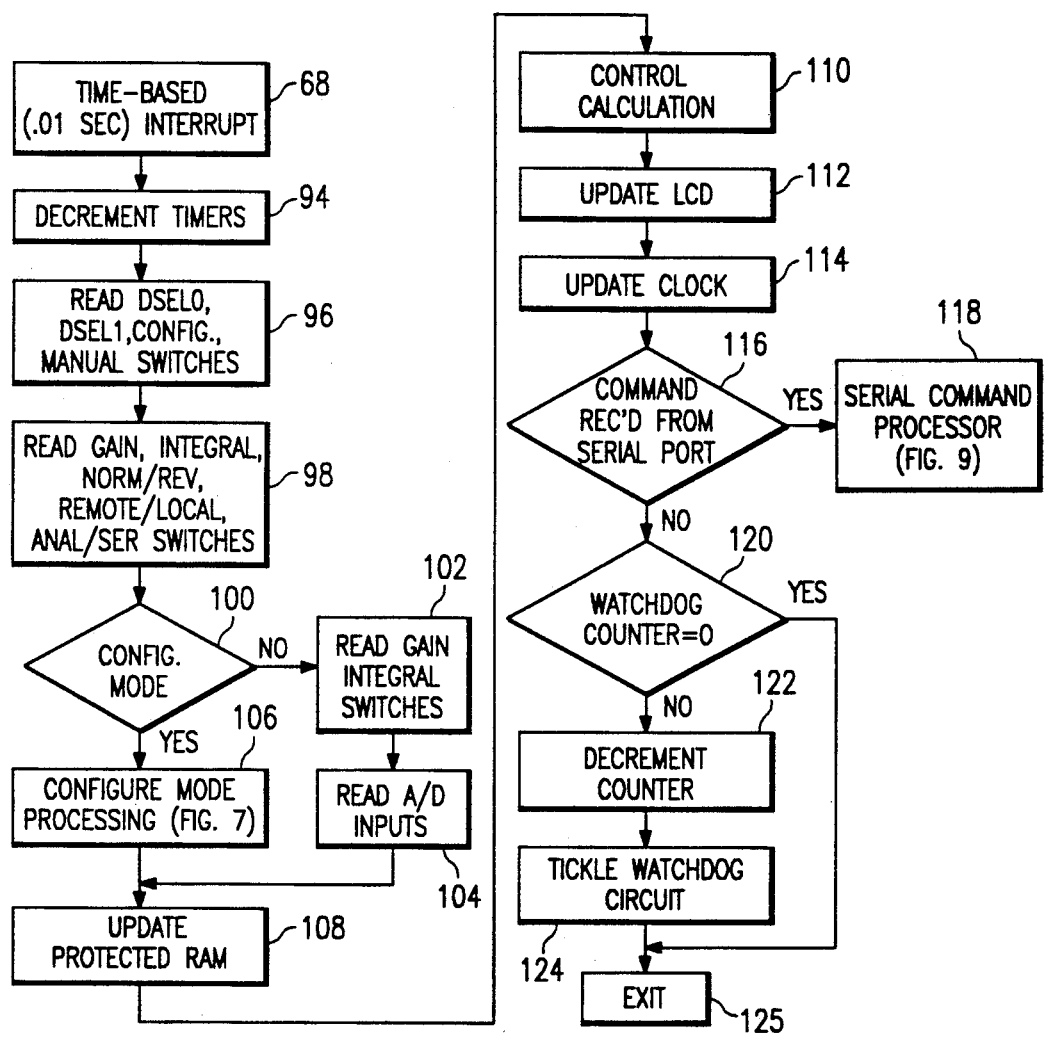
FIG. 6 illustrates a flow chart of the control calculation interrupt processing of the present invention.
Figure 8:
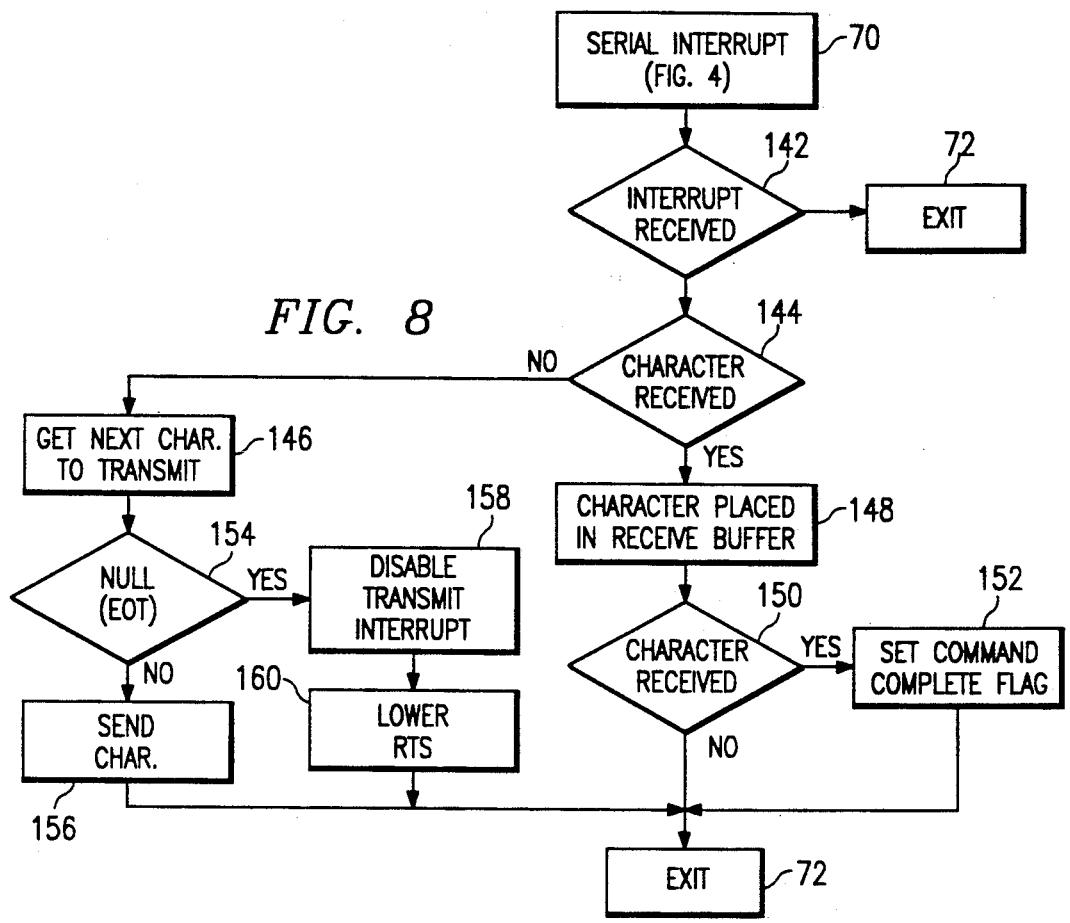
FIG. 8 illustrates a flow chart of the serial interrupt processing of the present invention.

The microprocessor 12 executes a program that resides in the EPROM memory 30. FIGS. 4-9 illustrate block diagrams of the program. For purposes of description, the program has been divided into six sections:
FIG. 4: Initialization and Main Loop;
FIG. 5: Cold boot initialization;
FIG. 6: Control calculation interrupt processing;
FIG. 7; Configure mode processing;
FIG. 8: Serial interrupt processing; and
FIG. 9: Serial command processing.
Each section is described separately.

FIG. 4—INITIALIZATION AND MAIN LOOP

System start-up of the controller 10 begins with a hardware reset of the microprocessor 12 in block 50. This condition can result from a power-up or a watchdog reset caused by an execution upset. In either case, the first steps are to disable the interrupts 52 and initialize certain hardware devices and components 54. The GAIN switch 24 is checked for one of three possibilities:

1) If the GAIN switch 24 is in the down position, decision block 56, execution branches to a test mode, block 58, used to functionally check the controller 10.

2) If the GAIN switch 24 is in the up position, decision block 60, a cold boot execution is forced. The protected RAM 34 is over-written and system, calculation and user variables are set to certain default values.

3) If the GAIN switch 24 is in the center off position, only a "warm" boot initialization is attempted.

First, certain necessary system variables are initialized. Next, in decision block 64, the list of calculation and user variables in protected memory 34 is checksummed and the result compared with a checksum value which may have been previously stored in protected memory 34. If this test fails, it indicates that the controller 10 has either never been initialized or that information in protected RAM 34 has somehow become useless. In either case, a cold boot is necessary since the controller 10 cannot operate properly if the user parameters are not intact. If the test is satisfactory, execution passes to block 66 where an attempt is made to start or continue execution. This latter situation is referred to as a "warm" boot.

After passing through the various stages of initialization, the time based control calculation interrupt, block 68, and the serial data interrupt, block 70, are activated.

Execution now passes into the main loop, which consists of four parts executed in sequence.

1) A check of the "CONFIG" input of parallel I/O 26 is made in decision block 72 to determine if the user wants to configure the controller 10. If so, a configuration flag is set in block 74 which is detected in the control calculation interrupt routine (FIG. 2c) and configuration processing is accomplished (FIG. 2d). If not, execution continues with block 76.

2) The watchdog counter is reset to 200 in block 76. After each control calculation interrupt (each 0.1 second), this counter is decremented and the watchdog circuit 16 is "tickled." The time required by the main loop determines how much the counter decreases from the initial value of 200 before being reset to 200 at the top of the main loop at block 72. A typical main loop time is between five and seven seconds. If an "upset" occurs that causes normal execution of the main loop to cease, the watchdog counter will eventually reach zero. At zero, the interrupt based "tickling" ceases and approximately 5 seconds later a hardware reset is generated by the watchdog timer circuit 16. Assuming the controller 10 is unattended, a warm boot is attempted. If successful, the controller 10 will have overcome the brief program upset. If not, processing will simply loop until a user carries out a forced cold boot, block 62. A warm boot for any reason lowers the watchdog output terminal WDOG1 to signal an external device that a malfunction or "upset"60 has occurred. If the system fully recovers, the watchdog output will return high in five minutes.

3) The next two parts of the program are subject to variation depending on the particular type of flow measurement and control algorithm used in a given application. Currently, two variations exist. In the first, the basic loop controller application, these blocks do not exist and execution returns from the watchdog counter directly to the beginning of the main loop at 72. In the second, these blocks perform orifice flow calculation/totalization in block 78 and differential set point determination for the flow rate control algorithm in block 80. It is expected that as other applications are encountered, these blocks will take on other forms. After the last operation in the main loop, block 80, execution returns to the top 72 and repeats.

FIG. 5—COLD BOOT INITIALIZATION

If a cold boot is requested or required, in decision block 60, the routine of FIG. 5 is executed. For a requested cold boot, the watchdog output is raised, block 80, to indicate no alarm condition. A memory write/read test is performed on both the unprotected and the protected RAM, 32 and 34. This test requires the GAIN 24 or INTEGRAL 26 switch to be raised or lowered so that the protected memory 34 will be temporarily unprotected. If the test fails, execution proceeds no farther, block 84. If the test succeeds, and while the protected memory 34 is unprotected, the default system and calculation variables are written, block 86, to protected RAM 34. In addition, a checksum is computed and stored in protected memory 34. Next, a checksum is computed for the EPROM 30 and compared in decision block 88, to a value stored in the last physical address of the EPROM 30. If the EPROM test fails, execution proceeds no farther, block 90. Otherwise, the "cold" boot routine completes and execution returns to the initialization portion of FIG. 4 in block 66.

FIG. 6—CONTROL CALCULATION INTERRUPT ROUTINE

FIG. 6 illustrates the flow chart of control calculation interrupt processing. Control calculations are time based occurring as interrupts each 0.1 second, block 68. At the beginning of the routine, several general purpose timers are serviced, block 94, followed by the reading and storing of switch and status input data in blocks 96 and 98. If not in configure mode, decision block 100, the GAIN 24 and INTEGRAL 26 switches are read with the appropriate variables updated, block 102. The analog inputs are also read and values stored, block 104. If the configure mode flag is set, the configure mode processing routine is executed (FIG. 2d), block 106, with parameters selected, changed and updated in the protected RAM 34, block 108. The control calculation follows, block 110, which includes a recalculation of the value of the analog (control) output. Depending on the various display modes, information is output to the LCD display, block 112. The software real time clock is updated, block 114, then a check is made to determine, decision block 116, if a command has been received by the serial input. If so, execution branches to the serial data command processor, block 118. Finally, if the watchdog counter has not reached zero (indicating a main loop reset has not occurred within the last 20 seconds), decision block 120, the watchdog counter is decremented, block 122, and the watchdog circuit tickled, block 124, and control returns, block 125.

FIG. 7—CONFIGURE MODE PROCESSING ROUTINE

During each 0.1 second control calculation interrupt (FIG. 6), if the configure mode flag was set in block 74 (FIG. 4) and detected in block 98, control passes to the configure mode processing routine, illustrated in the flow chart of FIG. 7. In decision block 128, if the INTEGRAL switch 22 is raised or lowered, a parameter is selected in block 130 and displayed along with its current value, block 131. If the GAIN switch 24 is raised or lowered, decision block 132, either the parameter value is increased or decreased or various options are selected, block 134, with the protected RAM updated, block 136. This completes execution of the configure mode processing routine and control returns to block 112 of the control calculation interrupt processing in FIG. 6.

FIG. 8—SERIAL (RS-232) INTERRUPT PROCESSING ROUTINE

Communication with the controller 10 may be accomplished through an external device coupled to the RS-232 level shifter 14, illustrated in the flow chart of FIG. 8. Serial data transfer is interrupt driven. If a serial interrupt occurs, as detected in decision block 142, a check is made to determine if a character has been received, decision block 144. If not, then the interrupt must have been a result of the completion of a serial character transmission and control proceeds to block 146.

If a character has been received, it is placed in a receive buffer in block 148. Further, if the character is a carriage return, decision block 150, the command complete flag in block 152 is set so that the command can be processed at the end of the next time based interrupt (FIG. 7). After the flag has been set, or if no carriage return was received, execution returns to block 72, FIG. 4.

If a transmit character has completed transmission, determined in decision block 154, the next character in the output buffer (if not exhausted) is transmitted, block 156. If the end of the transmit buffer was reached, then the transmit interrupt is disabled, block 158, and level shifter 14 output signal RTS is lowered, block 160. Control returns to block 72 of FIG. 4.

FIG. 9—SERIAL (RS-232) COMMAND PROCESSING ROUTINE

Figure 9:
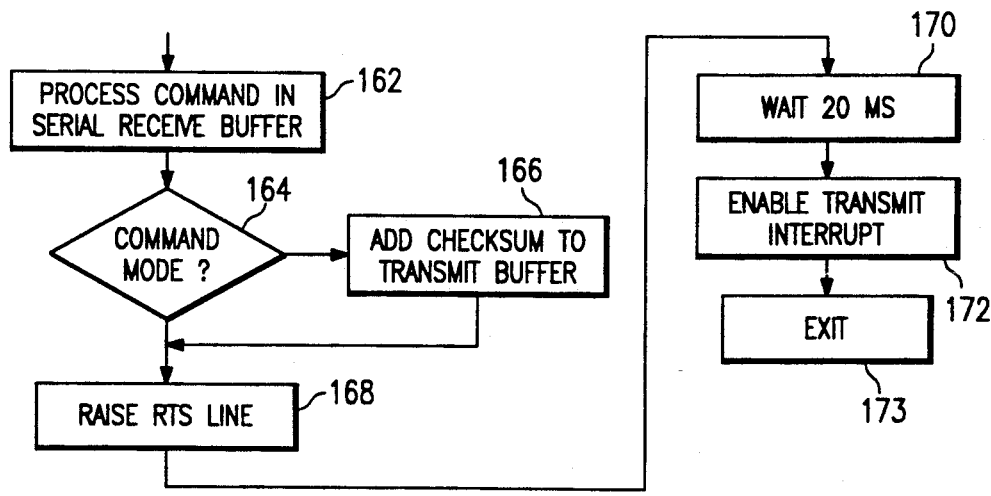
FIG. 9 illustrates a flow chart of the serial command processing of the present invention.

The serial command processing routine, illustrated in the flow chart of FIG. 9, is executed whenever a complete command has been received in the serial input buffer. The command is processed and an appropriate output buffer is constructed, block 162. Provision is made for a checksum in the output buffer, blocks 164 and 166, when a computer issues the command. The RTS (request-to-send) output of level shifter 14 is raised 20 milliseconds before the serial transmit interrupt is activated, block 168, a 20 millisecond waiting period is initiated, block 170, then the transmit interrupt is enabled, block 172. Execution then returns to exits in block 173.

APPLICATIONS

Flow Controller

Referring again to FIG. 1, use of the controller 10 as a flow rate controller of natural gas is illustrated. The controller 10 assumes the dual role of flow measurement computer and flow rate controller as follows:

A. Flow measurement computer—Orifice flow measurement is based on the principle that the corrected flow rate of a gas through a pipeline, 176, and an orifice 178 can be calculated using the formula:

$$F = C*SQRT(P*H)$$

where

F = the corrected flow rate;
C = a flow coefficient dependent on a number of factors including the diameter of the pipe 176 and orifice 178, composition of the gas, average specific gravity of the gas, base pressure and temperature, and flowing temperature;
P = the absolute pressure upstream or downstream of the orifice 178; and
H = the differential pressure drop across the orifice 178.

Performing a numerical integration on F allows flow volume data to be accumulated over time.

B) Flow rate controller—Basic flow rate control is accomplished by developing a proportional-integral control loop to maintain a desired differential pressure (called the "set point") across the orifice 178. The control input to the controller 10 (through the A/D converter 36) is a 1–5 Vdc signal ("MEASIN") from the differential pressure transmitter 180. The control output from the controller 10 (through the D/A converter 42) is a 4–20 mA signal ("CNTRL+" or "CNTRL−") to the I/P converter 182. The I/P 182 converts the 4–20 mA output signal into a 3–15 psi control pressure which drives the pressure actuated control valve 184. The valve 184 is in the flowing stream of the gas and can open or close to adjust the flow rate through the pipe 176. The flow rate change is reflected in a modified differential pressure at the orifice 178, thus closing the proportional-integral (PI) loop.

Detailed operation of the complete flow control device is as follows:

The user sets a target flow rate (using the integral and gain switches 22 and 24). The microprocessor 12 "back calculates" a differential pressure at existing conditions that would produce the target flow rate ($F_T$). Using the formula, $H_T = (1/P) 8 (F_T/C)^2$, the controller 10 calculates the target differential ($H_T$) and uses $H_T$ as the set point for its PI control loop. The controller 10 adjusts the valve 184 each 0.1 second attempting to achieve this target differential setpoint. The target differential setpoint is recalculated by the microprocessor 12 each 5–7 seconds to correct for operating condition changes. In time, the system will stabilize at the target flow rate.

A variation in the above approach is sometimes used for volume control. The user sets a target volume (rather than the rate as before) to be delivered during a contract period, typically 24 hours. The microprocessor 12 recalculates the target rate every five minutes given the portion of the contract volume yet to be delivered and the time left in the contract period. The advantage of this method is that the target flow rate is corrected periodically to compensate for flow rate errors and system down-time that occur during the contract period.

On/Off Controller

FIG. 10 illustrates the use of the controller 10 as an "on/off" well controller. Many older, free flowing oil wells must be operated intermittently to maintain economical production. The usual method is "time cycling" because it is the most convenient way. The operator utilizes a "cut-and-try" approach to determine the best "on" and "off" times for a particular well. The actual "on/off" control is usually accomplished manually operating a valve or by use of a timer device interfaced to a pneumatical control valve.

There are several changes from the arrangement shown in FIG. 1 to be noted. Referring to FIG. 10:

1) The static transmitter 196 has been moved downstream of the control valve 184. This is necessary so that the controller 10 can monitor the pipeline 176 pressure even when the well is shut-in and the control valve 184 is closed.

2) A third pressure transmitter 206 has been coupled between the controller 10 and the pipe 176 upstream of the control valve 184 to monitor "tubing" pressure. Since the preferred embodiment of the controller 10 has no spare analog inputs, the temperature input (used by temperature transmitter 194 in the application illustrated in FIG. 1) is adapted for this use.

For simplicity, the piping details of the separator/dehydrator 208 and the oil and water tanks, 210 and 212, respectively, are not shown. A fixed choke 214 is located at the well head 204 at the beginning of the pipe 176.

The variable choke application of the controller 10 lends itself particularly well to on/off well control. The location of the control valve 184 at the well head 204 makes it possible to "shut-in" the well or allow it to flow. With the noted changes, the controller 10 can monitor the difference between tubing pressure and pipeline pressure while the well is shut-in. This forms the basis for the "on" portion of the control technique:

The well head 204 is left shut-in until the tubing/pipeline difference pressure exceeds a predetermined value; then the control valve 184 is opened and an attempt is made to achieve a target gas flow rate. The technique further involves seeking the smallest difference pressure that will clear the accumulated liquid (oil and water) from the well bore while achieving the target gas flow rate.

The "off" portion of the technique is as follows:

Once liquid has cleared and a target been achieved for some minimum time, the well head 204 is shut-in if the gas flow rate stays below the preset flow rate for more then a preset period of time.

Both "on" and "off" aspects of the technique are based on the general characteristics of an intermittent flowing well. Briefly, such a well has an operating cyclic behavior as described below:

1) Assume the well has been shut-in for enough time to build up a tubing pressure adequate to overcome the pipeline pressure and lift the liquid in the well bore to the surface.

2) Allow the well to flow. Primarily, liquid will be produced at first but eventually a burst of gas will come. The gas will flow at a steadily decreasing rate as the tubing pressure declines.

3) Liquid will begin collecting in the bottom of the well bore as the gas flow rate becomes inadequate to provide lift velocity.

4) If nothing is done, the liquid will simply build up in the bore and could eventually "kill" the well. If the well is intermittently operated, it will be shut-in before this happens allowing the tubing pressure to recover.

The "on" and "off" techniques discussed above address this behavior in a manner that will produce the most oil with the least waste of the gas pressure which is the energy source for the lift.

In addition to the piping changes already mentioned, certain changes to the basic flow control software are also necessary, including the addition of the following user configurable parameters (selected during configuration by manipulating the two switches 22 and 24):

TRGT RATE—Target flow rate to be achieved.
STRT TPDP—Starting tubing/pipeline differential pressure.
CHNG TPDP—Pressure change increment for new TPDP.
TIME MIN—The minimum time for achieving target gas flow rate.
TIME MAX—The maximum time the cycle will be allowed to continue with the gas flow rate below target flow rate.
RESK CNT—Reseek count.

Figure 11:
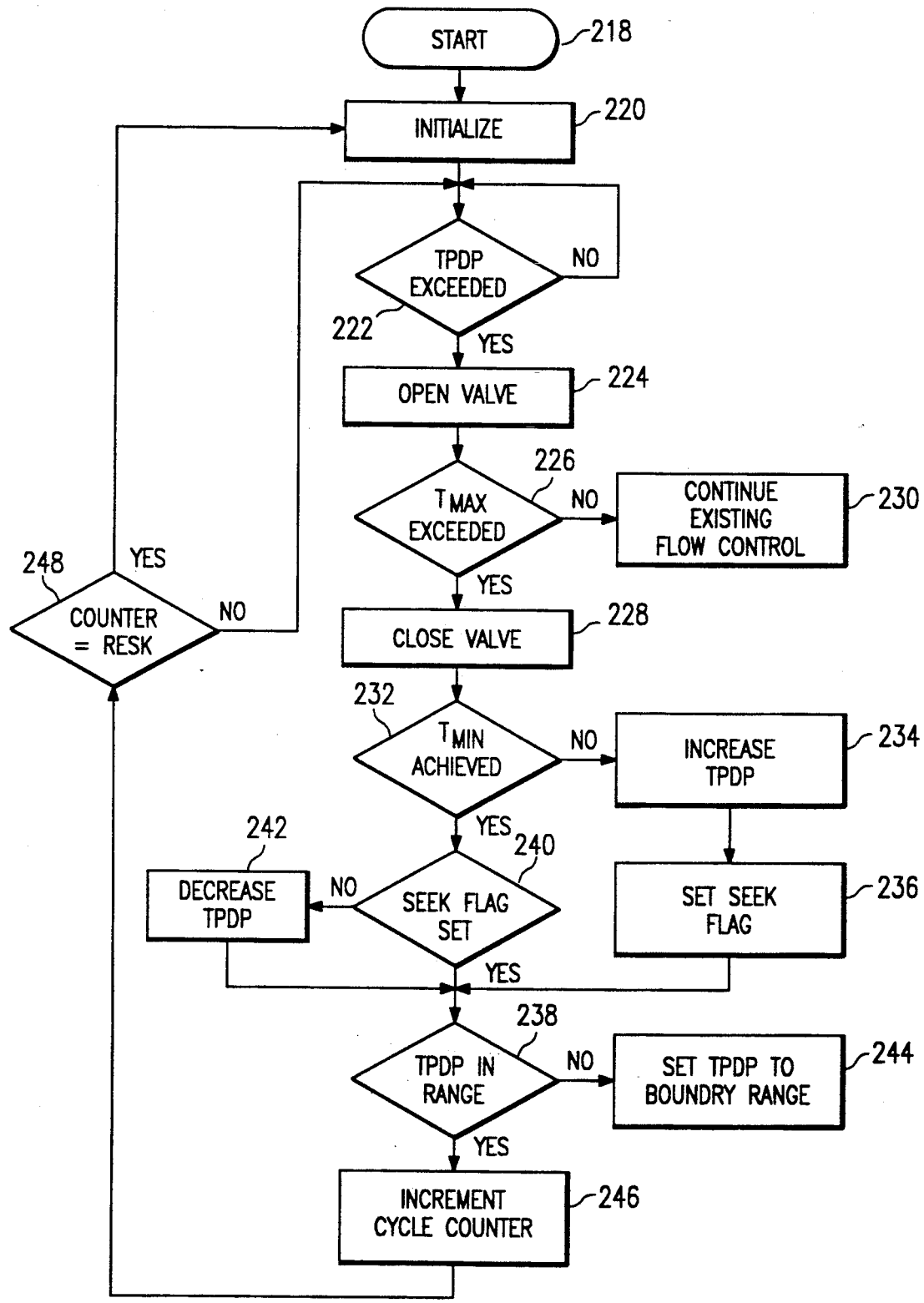
FIG. 11 illustrates a flow chart of the operation of the present invention as an on/off controller.

FIG. 11 illustrates a flow chart of the "on/off" technique implemented in software using the following procedures, beginning with block 218:

1) Set the tubing/pipeline differential pressure check value (TPDP) equal to STRT TPDP, set cycle count to zero, and set seek flag to indicate seek for best TPDP underway, block 220.

2) When the actual tubing/pipeline differential pressure exceeds TPDP, determined in decision block 222, start cycle by opening the control valve 184 in block 224.

3) If TIME MAX passes, decision block 222, either before or after TIME MIN is achieved, close the control valve 184 and shut-in the well, block 228. Otherwise, continue executing the existing flow control procedure, block 230.

3a) If TIME MIN is not achieved, decision block 232 the cycle has failed. In this case, increase TPDP by CHNG TPDP, block 234, set the seek flag to indicate seek done, block 236, and continue at decision block 238.

3b.i) If the seek flag indicates seek done, decision block 240, then continue at decision block 238.

3b.ii) If the seek flag indicates seek still underway, decision block 240, decrease TPDP by CHNG TPDP, block 242, then continue at decision block 238.

4) In decision block 238, a check is made to be sure that TPDP is bounded by STRT TPDP and zero. If outside, set TPDP to nearest boundary value, block 244.

5) Increment the cycle count by one, block 246. At block 248, cycle count has reached RESK CNT, then return to decision block 220. Otherwise, continue at decision block 222.

The general operational characteristics of this procedure can be summarized as follows:

1) A free flowing well that can continuously deliver gas at a target rate will do so with no shut-in.

2) Otherwise, the controller 10 will seek the least tubing/pipeline difference pressure that will produce the liquid in the well bore and achieve a sustained gas flow rate of defined duration.

3) If conditions change so that flow is no longer achievable at the current tubing/pipeline difference pressure, the controller 10 will increase this pressure difference in an attempt to reachieve sustained target flow. The procedure never again seeks the "least" pressure difference until after the cycle count limit is exceeded.

Another application is similar to the variable choke application with on/off control just discussed. The standard variable choke application is not illustrated but is herein described. Often, wells flow liquid in "slugs" that tend to momentarily clog the fixed opening of the well head choke 214 which, in turn, restricts and slows the production of liquid. Opening the well head choke 214 is not a good idea because this allows too much gas flow which tends to deplete the driving pressure in the gas reserve. With the controller 10, the well head choke 214 is opened widely with the gas flow rate set and limited by the controller 10 flow control capability. When a slug reaches the control valve 184 (which is now acting as a "variable" as opposed to "fixed" choke), the differential pressure drops at the orifice metering point 178 (the gas flow having been "pinched" off by the liquid slug clogging the valve). The controller 10 reacts by opening the valve 184 to its widest position as it attempts to recover gas flow. The opening of the valve 184 has the effect of reducing the flow constriction allowing the slug to clear more quickly. As the slug clears, gas flow begins to reappear at the orifice metering point 178 and the controller 10 reacts by closing the valve 184 to limit the gas flow rate to the prescribed set point.

This method can provide a 15% or better improvement in Gas-Oil Ratio thereby producing more oil from the well at a given gas flow rate. Preservation of the gas reserve can extend free-flowing life of the well with the possibility of increased total oil production.

Volume Controller

FIG. 12 illustrates the use of the controller 10 as a volume and rate controller. As in previous applications, an orifice 178 is inserted into the pipeline 176 and static and differential pressure transmitters 196 and 180 are attached to the orifice. Signals from the pressure transmitters 196 and 180 serve as inputs to a flow computer 252, the output of which is sent to the serial input port (level shifter 14) of the controller 10. The output of the differential pressure transmitter 180 is also sent directly to the analog-to-digital converter 36 of the controller 10. The controller 10 sends its control signals through the digital-to-analog converter 42 to the I/P converter which controls the control valve 184. Operating pressure for the I/P converter 182 is supplied by valve 202 coupled to the pipeline 176, the regulator 198 and the filter 200. As in the previous applications, power to the controller 10 is supplied by the battery 186 which is kept charged by the solar array 188.

In operation, the contract volume (volume-to-deliver) and the contract period is entered into the flow computer 252. The flow computer 252 calculates the amount of time left in the contract period, divides the time remaining into the volume-to-deliver parameter and obtains a target flow rate. After comparing the actual flow rate (obtained from signals from the pressure transmitters 196 and 180) to the calculated target flow rate, the flow computer 252 calculates an operating set point which is transmitted to the controller 10. Then, as in previous applications, the controller 10 directs the I/P converter 182 to vary the opening of the control valve 184. The measure/calculate/control loop is continuously repeated until the desired volume has been delivered at which time the flow control computer 252 directs the controller 10 to close the control valve 184.

In order to protect the mechanical elements of the system, minimum and maximum flow rate limitations can be entered into the flow computer 252. Protection is also provided in the event the flow computer 252 fails. In that event, the controller 10 relies on the local set point established by the potentiometer 38. Furthermore, in the event of a failure in the flow computer 252, the microprocessor 12 would direct an alarm call to be made through the telephone modem 190 and the local telephone lines 192 (not shown in FIG. 12).

In the preferred embodiment, the controller 10 is completely sealed against the elements, allowing its use in a wide range of climatic conditions of temperature and precipitation. The printed circuit board is coated with a neoprene-based sealer to protect against corrosive gases and condensation. The controller 10 is designed to operate in hazardous locations and in the presence of explosive gases.

Although the present invention has been described in detail, it should be understood that various changes, substitutions and alterations can be made herein without departing from the spirit and scope of the invention as defined by the appended claims.

TABLE I
SUMMARY OF CONFIGURATION PARAMETERS

25. Fix differential options "NO,YES"
24. Fixed differential
23. Fix pressure options "NO,YES"
22. Fixed pressure
21. Fix temperature options "NO,YES"
20. Fixed temperature
19. Time minute
18. Time hour
17. Date day
16. Date month
15. Date year
14. Volume to deliver
13. Span of differential transmitter
12. Span of pressure transmitter
11. Span of temperature transmitter
10. Span flow rate options "1000,10000,50000" MCF/DAY
9. Dead band 0.0
8. Control mode options "DIFF, FLOW, VOL, MNTR"
7. Display mode options "CRTL, FLOW"
6. Remote set differential
5. Remote set flow rate
4. Contract volume
3. Minimum flow rate in MCF/DAY
2. Maximum flow rate in MCF/DAY
1. Contract hour RAISE
|
INTEGRAL Switch
|
LOWER 1. Orifice diameter
2. Specific gravity
3. Inert CO2
4. Inert N2
5. Pipe diameter
6. Pressure base
7. Temperature base
8. Atmospheric pressure
9. Tap type
10. Tap location
11. Orifice material

What is claimed is:

1. A system for controlling a flow of fluids through a pipe, comprising:

processor circuitry;

input circuitry associated with said processor circuitry having first and second switches for configuring the system in a predetermined configuration and providing operating parameters to the system, said first switch is operable in a first position to increase a value of an integral time parameter of the system and is operable in a second position to decrease said value of said integral time parameter, said second switch is operable in a first position to increase a value of a proportional gain parameter of the system and is operable in a second position to decrease said value of said proportional gain parameter, said first switch is operable to select among a plurality of configuration parameters when said first switch is in said first and second positions and said second switch is operable to raise a value of said selected parameter when said second switch is in said first position and lower said value of said selected parameter when said second switch is in said second position;

memory circuitry associated with said processor circuitry for storing said configuration and said operating parameters;

receiving circuitry associated with said processor circuitry for receiving input signals from external sensors coupled to said receiving circuitry; and transmit circuitry responsive to said operating parameters and said input signals for transmitting output control signals to control the system.

2. The input circuitry of claim 1 and further comprising protection circuitry associated with said memory circuitry wherein said operating parameters can be changed only if one of said first switch and said second switch is in said first position or said second position and not in a third position.

3. The input circuitry of claim 2 wherein said first switch and said second switch each comprise a double-pole, double-throw switch with a return to off position.

4. A system for controlling the flow of fluids through a pipe, comprising:

processor circuitry having at least one bus line and operable to control the system;

level shifting circuitry coupled to said processor circuitry for coupling said processor circuitry to an external serial device;

a watch-dog timer coupled to said processor circuitry for protecting the system from accidental interruption of operation of said processor circuitry;

a switch buffer coupled to said processor circuitry for coupling a first external switch to said processor circuitry, said first external switch having a double-pole, double-throw switch with a return to off position and is operable to increase a value of an integral time parameter of the system when said first switch is in a first position and lower said value of said integral time parameter when said first switch is in a second position;

an analog-to-digital converter coupled to said bus line for receiving signals from external sensors;

a digital-to-analog converter coupled to said bus line for sending control signals from said processor circuitry to an external control device;

read only memory coupled to said bus line for storing operating instructions for said processor circuitry;

random access memory coupled to said bus line for storing configuration and operating parameters;

parallel input/output circuitry coupling to said bus line;

display circuitry coupled to said parallel input/output circuitry for displaying operating and configuration parameters; and a potentiometer coupled to said analog-to-digital converter for setting an operating setpoint of the system.

5. The switch buffer circuitry of claim 4 and further comprising a second external switch having a double-pole, double-throw switch with a return to off position and is operable to increase a value of a proportional gain parameter of the system when said second switch is in a first position and lower said value of said proportional gain parameter when said second switch is in a second position.

6. The processor circuitry of claim 5 and further comprising configuration circuitry wherein said first switch is operable to select among a plurality of configuration parameters when said first switch is in said first and second positions and said second switch is operable to raise a value of said selected parameter when said second switch is in said first position and lower said value of said selected parameter when said second switch is in said second position.

7. The system of claim 6 wherein said random access memory comprises a protected portion and an unprotected portion, said protected portion having write-protect circuitry responsive to second poles of said first and second switches.

8. Circuitry for operating a closed-loop proportional-integral controller, comprising:
a first switch for increasing the integral time value of the controller when said first switch is in a first position and decreasing the integral time value when said first switch is in a second position;

a second switch for increasing the proportional gain of the controller when said second switch is in a first position and decreasing the proportional gain when said second switch is in a second position; and configuration circuitry to enable said first switch to select among a plurality of configuration parameters when said first switch is in said first and second positions and to enable said second switch to increase the value of the configuration parameter selected with said first switch when said second switch is in said first position and decrease said value when said second switch is in said second position.

9. The circuitry of claim 8 wherein said first and second switches each comprise a double-pole, double-throw switch with an off position.

10. A method of forming a system for controlling a flow of fluids through a pipe, comprising:
forming processor circuitry;
forming input circuitry associated with said processor circuitry having first and second switches for configuring the system in a predetermined configuration and providing operating parameters to the system, said first switch is operable in a first position to increase a value of an integral time parameter of the system and is operable in a second position to decrease said value of said integral time parameter, said second switch is operable in a first position to increase a value of a proportional gain parameter of the system and is operable in a second position to decrease said value of said proportional gain parameter, said first switch is operable to select among a plurality of configuration parameters when said first switch is in said first and second positions and said second switch is operable to raise a value of said selected parameter when said second switch is in said first position and lower said value of said selected parameter when said second switch is in said second position;

forming memory circuitry associated with said processor circuitry for storing said configuration and said operating parameters;

forming receiving circuitry associated with said processor circuitry for receiving input signals from external sensors coupled to said receiving circuitry; and forming circuitry responsive to said operating parameters and said input signals for transmitting output control signals to control the system.

11. The method of claim 10 wherein said step of forming said input circuitry further comprises forming protection circuitry associated with said memory circuitry wherein said operating parameters can be changed only if one of said first switch and said second switch is in said first position or said second position and not in a third position.

12. A method of forming circuitry for operating a closed-loop proportional-integral controller, comprising the steps of:
forming a first switch for increasing the integral time value of the controller when the first switch is in a first position and decreasing the integral time value when the first switch is in a second position;

forming a second switch for increasing the proportional gain of the controller when the second switch is in a first position and decreasing the proportional gain when the second switch is in a second position; and forming configuration circuitry to enable the first switch to select among a plurality of configuration parameters when the first switch is in the first and second positions and to enable the second switch to increase the value of the configuration parameter selected with the first switch when the second switch is in the first position and decrease the value when the second switch is in the second position.

13. A method for operating a closed-loop proportional-integral controller, comprising the steps of:
increasing the integral time value of the controller when a first switch is in a first position and decreasing the integral time value when the first switch is in a second position;

increasing the proportional gain of the controller when a second switch is in a first position and decreasing the proportional gain when the second switch is in a second position;

selecting among a plurality of configuration parameters when the controller is in a configuration mode and the first switch is in the first and second positions;

increasing the value of the configuration parameter selected when the controller is in the configuration mode and the second switch is in the first position; and decreasing the value when the controller is in the configuration mode and the second switch is in the second position.

14. A system for controlling the flow of a fluid through a pipe carrying said fluid from a well, comprising:
means for separating a gas from said fluid;

means for monitoring the difference between a pressure of said fluid in said pipe at the head of said well and a pressure of said gas in said pipe where said gas exits said separation means; and means for obtaining a target gas flow rate.

15. The system of claim 14 wherein said monitoring means comprises:
a first pressure transmitter for ascertaining the pressure of said fluid in said pipe at said well head; and
a second pressure transmitter for ascertaining the pressure of said gas in said pipe where said gas exits said separation means.

16. The system of claim 14 wherein said obtaining means comprises:
a controller for receiving signals from said monitoring means and for comparing said difference to a predetermined value; and
a control valve responsive to said controller for increasing and decreasing the rate at which said fluid flows through said pipe.

17. The system of claim 16 wherein said controller comprises:
processor circuitry;
input circuitry associated with said processor circuitry having first and second switches for configuring the system in a predetermined configuration and providing operating parameters to the system;
memory circuitry associated with said processor circuitry for storing said configuration and said operating parameters;
receiving circuitry associated with said processor circuitry for receiving signals from said monitoring means; and
circuitry responsive to said operating parameters and said signals for transmitting output control signals to control said control valve.

18. The input circuitry of claim 17 and further comprising circuitry wherein said first switch is operable in a first position to increase the value of the integral time parameter of the system and is operable in a second position to decrease the value of the integral time parameter.

19. The input circuitry of claim 18 and further comprising circuitry wherein said second switch is operable in a first position to increase the value of the proportional gain parameter of the system and is operable in a second position to decrease the value of the proportional gain parameter.

20. The input circuitry of claim 19 and further comprising configuration circuitry wherein said first switch is operable to select among a plurality of configuration parameters when said first switch is in said first and second positions and said second switch is operable to raise the value of the selected parameter when said second switch is in said first position and lower the value of said selected parameter when said second switch is in said second position.

21. The input circuitry of claim 20 and further comprising protection circuitry associated with said memory circuitry wherein said operating parameters can be changed only if one of said first switch and said second switch is in said first position or said second position and not in a third position.

22. The input circuitry of claim 21 wherein said first switch and said second switch each comprise a double-pole, double-throw switch with a return to off position.

23. A system for controlling a flow of a fluid through a pipe carrying the fluid from a well, comprising:

means for monitoring a difference between an actual flow rate of the fluid and a predetermined target flow rate, said monitoring means comprising:
means for ascertaining a pressure of the fluid in the pipe having a static pressure transmitter for measuring a static pressure of the fluid in the pipe and a differential pressure transmitter for measuring a pressure across an orifice in the pipe;
means responsive to said ascertaining means for determining said actual flow rate; and
means for comparing said actual flow rate to said predetermined target flow rate; and means responsive to said monitoring means for obtaining a target gas flow rate.

24. A system for controlling a flow of a fluid through a pipe carrying the fluid from a well, comprising:
means for monitoring a difference between an actual flow rate of the fluid and a predetermined target flow rate; and
means responsive to said monitoring means for obtaining a target gas flow rate, said obtaining means having a flow computer responsive to said monitoring means for calculating a set point, a controller for receiving signals from said flow computer, and a control valve responsive to said controller for increasing and decreasing a rate at which the fluid flows through the pipe wherein said controller comprises:
processor circuitry;
input circuitry associated with said processor circuitry having first and second switches for configuring the system in a predetermined configuration and providing operating parameters to the system, said first switch is operable in a first position to increase a value of an integral time parameter of the system and is operable in a second position to decrease said value of said integral time parameter, said second switch is operable in a first position to increase a value of a proportional gain parameter of the system and is operable in a second position to decrease said value of said proportional gain parameter, said first switch is operable to select among a plurality of configuration parameters when said first switch is in said first and second positions and said second switch is operable to raise a value of said selected parameter when said second switch is in said first position and lower said value of said selected parameter when said second switch is in said second position;
memory circuitry associated with said processor circuitry for storing said configuration and said operating parameters;
receiving circuitry associated with said processor circuitry for receiving signals from said flow computer; and
circuitry responsive to said operating parameters and said signals for transmitting output control signals to said control valve.

25. The input circuitry of claim 24 and further comprising protection circuitry associated with said memory circuitry wherein said operating parameters can be changed only if one of said first switch and said second switch is in said first position or said second position and not in a third position.

26. The input circuitry of claim 25 wherein said first switch and said second switch each comprise a double-pole, double-throw switch with a return to off position.

* * * * *

UNITED STATES PATENT AND TRADEMARK OFFICE
CERTIFICATE OF CORRECTION

PATENT NO. : 5,161,100
DATED : November 3, 1992
INVENTOR(S) : Richard B. Whipple It is certified that error appears in the above-identified patent and that said Letters Patent is hereby corrected as shown below:

Column 6, line 66, after "upset" delete "60".

Column 7, line 8, after "calculation/" delete "-".

Column 7, line 21, after "write/" delete "-".

Column 9, lines 26 & 27, move line 27 beginning with "to" up to line 26 after "input".

Column 10, line 23, after "separator/" delete "-".

Column 10, line 46, after "target" insert -- gas flow rate has --.

Column 11, line 38, after "232" insert -- , --.

Signed and Sealed this

Thirtieth Day of November, 1993

Attest:

BRUCE LEHMAN

*Attesting Officer*    *Commissioner of Patents and Trademarks*